Figure 1:
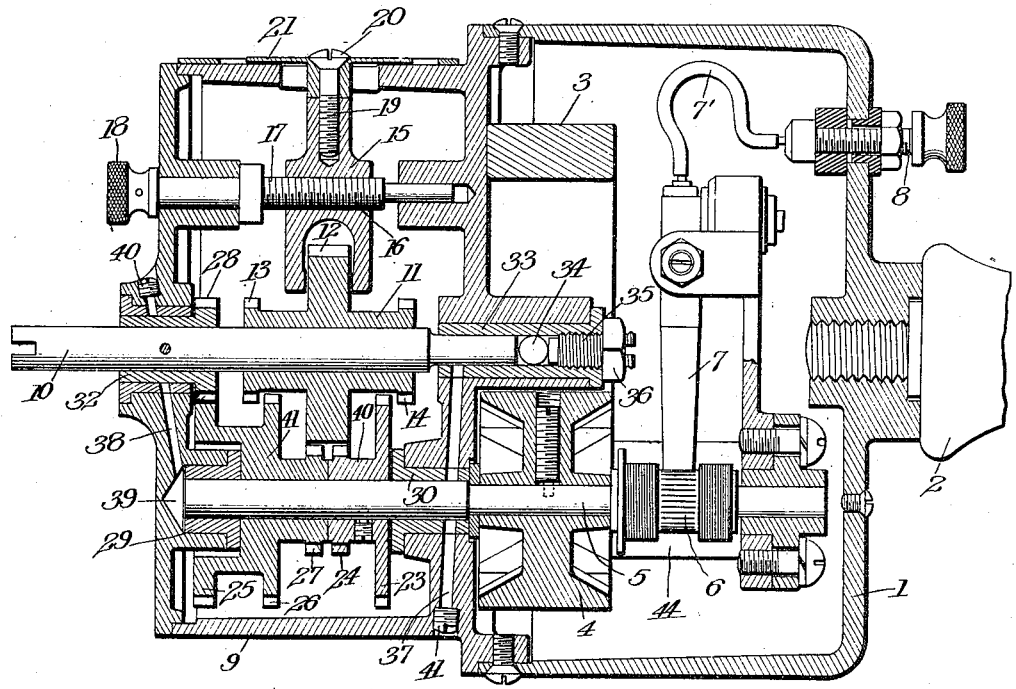

P. VAN S. KOLFF.
TACHOMETER.
APPLICATION FILED MAY 2, 1916.

1,266,487.

Patented May 14, 1918.

Inventor
Petrus van Santen Kolff
by Byrnes Townsend & Brickenstein
Attorneys

UNITED STATES PATENT OFFICE.

PETRUS VAN SANTEN KOLFF, OF PHILADELPHIA, PENNSYLVANIA, ASSIGNOR, BY MESNE ASSIGNMENTS, TO THE ELECTRIC TACHOMETER CORPORATION, A CORPORATION OF DELAWARE.

TACHOMETER.

1,266,487.  Specification of Letters Patent.  Patented May 14, 1918.

Application filed May 2, 1916. Serial No. 94,929.

*To all whom it may concern:*

Be it known that I, PETRUS VAN SANTEN KOLFF, a citizen of the United States of America, residing at Philadelphia, in the county of Philadelphia and State of Pennsylvania, have invented certain new and useful Improvements in Tachometers, of which the following is a specification.

This invention relates to electrical speed-indicating mechanism, and particularly to that type in which an electric generator is driven by the shaft whose speed is to be indicated, the speed values being indicated by the scale deflections of a volt or milli-volt meter connected to the electric generator.

The main object of the invention is to provide a mechanism in which, by the use of a suitably selected variable speed-change gearing, many of the electrical and mechanical difficulties of the present type of indicating mechanism are obviated.

In the previous types of speed-indicating mechanisms, where the speed ratio between the main spindle and the armature shaft is constant, the following objections are noticed:—

(A) When calibrating these old types of magneto-generators, in conjunction with a volt meter, having two or more scale ranges of speed, it is necessary to calibrate for each separate scale range, which is usually effected by inserting in series with the electrical circuit a certain amount of "manganin" resistance wire and adjusting the quantity of this wire so that at a known speed of the magneto generator the reading on the volt meter exactly corresponds to this speed. In other words, if the old type of magneto generator were to be calibrated to the volt meter with three scale ranges, say in the ratios of one to four to sixteen, it would be necessary to form three circuits between the magneto generator and the indicator, each circuit including the indicator circuit having a resistance proportionate to the value of the scale range. As each circuit would consist partly of copper and partly of "manganin" wire, and as copper has a well known temperature error, whereas "manganin" wire has practically no temperature error, it is evident that such a tachometer would show various temperature errors when used at the same temperature over all three scale ranges.

On the other hand, in my type of speed-indicating mechanism with variable speed-change gearing between the shaft and the magneto-generator, the scale ranges are in absolute proportion to the speed ratios between the main spindle and the armature shaft which speed ratios are obtained by means of the speed change gears. It is therefore evident that the speed of the armature shaft, corresponding to full scale deflection on the indicator, for any of the three scale ranges, is the same, and that it is only necessary to make one calibration for one scale range to be selected at will and the readings on the other scale ranges, for increased or reduced speeds, will be automatically correct.

(B) By choosing suitable ratios in the transmission gears of this magneto generator, it is possible to obtain a maximum armature speed which lies well within its limits of safety and efficient operation. In one form of my mechanism, the same armature speed of 1000 R. P. M. corresponds to maximum scale readings of either 500, 2000 or 8000 R. P. M. In the old types of mechanisms, this result could not possibly have been obtained without separate resistance for each speed range for at the minimum speed the armature would have to be driven at an extremely low and inefficient speed, whereas for the maximum scale deflection the speed of the armature shaft would be so high as to cause not only excessive mechanical wear and possibly damage, but also self induction currents in the armature, thus impairing the accuracy of the indication. Moreover with only one resistance in the circuit of my device the indications are effected by a uniform temperature error whatever the speed of the main spindle may be.

This invention is illustrated in the drawings, in which—

Figure 2:
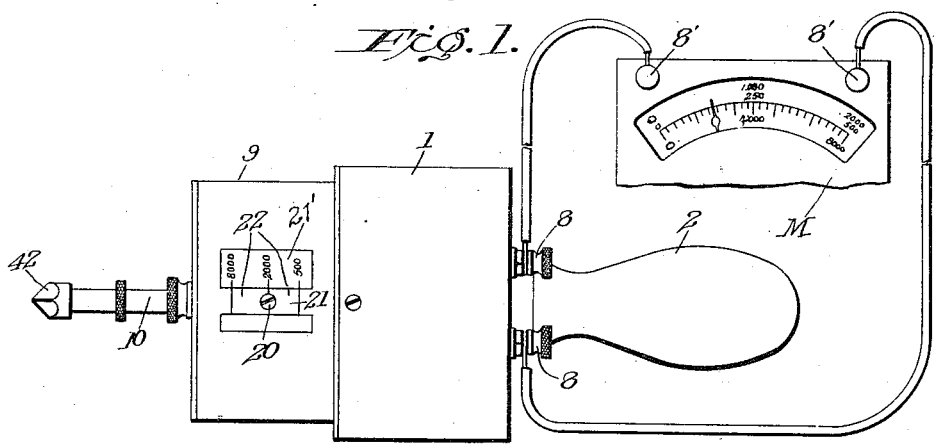

Figure 1 is a central longitudinal section through the casing containing the magneto generator and the speed-change mechanism, and Fig. 2 is a side elevation of the same device showing the scale-plate on the outside of the casing indicating to which scale range the speed gears are set; and also the milli-volt meter.

As shown in the drawings and outlined above, the device consists of an open-ended casing 1, having a handle 2, in which casing is the magneto-generator comprising the U-shaped permanent magnet 3, the armature 4, mounted on shaft 5, the commutator 6, mounted on the outer end of shaft 5, and brushes 7. These brushes are connected through wires 7′ to binding posts 8, projecting through the casing 1, and circuit wires may be therewith connected to binding posts 8′ of a volt or milli-volt meter, M, having a triple scale.

Suitably fastened to the open end of the casing 1 is another casing 9, in which is mounted the speed change gearing. This speed change mechanism comprises the main spindle 10, which extends through casing 9, and is suitably journaled at each end thereof. Loosely and slidably mounted on shaft 10, is a hub 11, having a central gear 12, of a large diameter and smaller gears 13 and 14 at each end thereof, these last two gears being of the same diameter. This hub 11, is moved along shaft 10 by means of a yoke 15, having a threaded bore 16, through which runs a threaded shaft 17, which is suitably journaled at each end in the casing 9, and at its outer end is actuated by a thumb nut 18, to move the yoke 15 one way or another along the shaft 17. The upper end of yoke 15 extends through the casing 9 and has a bore 19 into which is threaded a screw 20 between the head of which and the upper end of yoke 15 is held a plate 21 having thereon graduations 22. Attached to the outside of the casing 9 adjacent the plate 21 is a plate 21′ on which are graduations corresponding to those on the plate 21 and which are marked with figures denoting the maximum speed measured for that particular position of the yoke 15 which of course denotes the particular set of gears which are in mesh. The armature shaft 5 extends through casing 9 and is journaled therein, the part of shaft 5 which extends through casing 9 being of a larger diameter than the part which is in casing 1 and forming the jack shaft of the speed-change gearing. This allows of the shaft being designed to properly bear the stresses and wear due to the action of the gears thereon.

Fixedly mounted on shaft 5 within the casing 9 and adjacent the casing 1 is a hub 40 having a large and small gear 23 and 24 respectively. Loosely mounted on said shaft and also within casing 9 is another hub 41, having thereon two large gears 25, 26 and one small gear 27, gear 27 being adjacent the gear 24 and of the same diameter. The two large gears 25 and 26 are also of the same diameter. Fixedly mounted on shaft 10 and journaled within a sleeve in the casing 9 is a gear wheel 28.

The casing 9 is closed from the casing 1 so that the oil and grease used for lubricating the wearing parts therein will not pass through and affect the working of the armature 4. To properly effectuate this the shafts 5 and 10 are mounted as follows:— Both ends of shaft 5 within casing 9 are journaled in sleeves 29 and 30 respectively, said sleeves fitting tightly within their respective apertures in the casing 9 so that any leakage around the same is eliminated. The shaft 10 is likewise journaled in sleeves 32 and 33 which fit tightly within apertures in the casing 9. In order to form a thrust bearing for the shaft 10 when the outer end of the same is thrust against the shaft, the speed of which is to be measured, I provide within a bore of sleeve 33 a ball bearing 34 which is backed up by a pin 35 threaded into the bore of sleeve 33 from the casing 1 and locked in a fixed position by a nut 36.

In order to properly lubricate the spindles 10 and 5, I provide a structure as follows:— a channel 37 is bored in casing 9 adjacent casing 1, which channel extends through sleeve 30 around shaft 5 and further in to sleeve 33 and spindle 10. Another channel 38 is likewise bored in casing 9 adjacent sleeve 32, through said sleeve, around spindle 10 and further into a space 39 adjacent the end of sleeve 29 and shaft 5. The openings of these channels are closed by means of screws 40 and 41.

The outer end of spindle 10 is provided with a head 42 which in the operation of the device is pressed up against the end of the rotating shaft, the speed of which is to be measured.

It will be readily seen that when hub 11 is moved to the left of the position shown in the drawing, the armature 4 will be connected to shaft 10 through gears 23, 14, 12, 27, 25 and 28. In this position of the hub 11 the armature is driven through a reducing ratio of gears by shaft 10 so as to be able for the same scale deflection of the volt meter to register high speeds of shaft 10. When hub 11 is in the mid position as shown in the drawing, the connection between armature 4 and shaft 10 is through gears 24, 12, 27, 25 and 28. In this position the armature registers the medium speeds of shaft 10. When the hub 11 is moved to the right of the position shown in the drawings the connection between the armature and shaft 10 is through gears 24, 12, 13, 26, 25 and 28. In this position the armature is connected with shaft 10 through a high gear ratio so that it is thereby adapted to register the lower speeds of the shaft 10. The gears as shown on the accompanying drawing are so selected that an armature speed of 1000 R. P. M. will give a maximum deflection of the volt or milli-volt meter at 500, 2000, and 8000 R. P. M. respectively, it being understood that by suitable changes of gear sizes and ratios, practically any triple set of scale ranges may be obtained. It is therefore necessary merely to calibrate the volt meter through the entire range of its deflections for one set of gears when it will be seen that the other gear ratios will be in proper proportion.

The advantages of my improved machine are (1) that it is less costly to make in that, instead of three, only one calibration is necessary; (2) that by selection of suitable change gears, such a maximum armature speed may be selected as lies well within the limits of safe operation and of efficient commutation between brushes and commutator; (3) as the range of armature speed remains the same, for all indicated speed ranges, the indications on the volt meter will all be subject to the same temperature errors, if any; and, (4) that the designed machine enables those parts most subjected to wear to be made of sufficient strength; and also lessens the possibility of injury to the electrical mechanism from oil and grease and particles of worn metal thrown off by the gears.

While I have described my device in detail, it will be understood that my invention is not limited to the use of the particular mechanism described. Obviously, as above indicated, other sets of scale ranges than those shown, and more or less than three such sets may be used, by appropriate changes of gearing. So also, while I have described a milli-volt meter as a suitable indicating instrument, other forms of indicating apparatus, such as are well known in the art may be used.

I claim:—

1. A tachometer device comprising a generator, a main spindle adapted to be rotated by the shaft whose speed is to be measured, an armature shaft, variable speed-change gearing for driving the armature shaft from the main spindle, the gear ratios of said gearing being so chosen that for any position of the change gears a predetermined maximum speed of the spindle will correspond to one and the same predetermined speed of the armature shaft.

2. A tachometer device comprising a generator, a spindle adapted to be rotated by the shaft whose speed is to be measured, an armature shaft, variable speed change gearing for driving the armature shaft from the spindle and an electric measuring instrument attached to the generator.

3. A tachometer device comprising a generator, a spindle adapted to be rotated by the shaft whose speed is to be measured, an armature shaft, variable speed change gearing for driving the armature shaft from the spindle, and an electric indicator having a plurality of scales, said scales having range ratios equal to the speed ratios of the speed change gearing.

4. A tachometer device comprising a casing, a partition dividing the casing into two separate chambers, a generator mounted in one of said chambers and having its armature shaft extending into the second chamber, a main spindle mounted in said second chamber and variable speed-changing gearing connecting the main spindle and armature shaft.

5. A tachometer device comprising a casing, a partition dividing the casing into two separate chambers, a generator mounted in one of said chambers and having its armature shaft extending into the second chamber, a main spindle mounted in said second chamber, variable speed-changing gearing connecting the main spindle and armature shaft, and means on the exterior of the casing for indicating the position of the speed-changing gearing.

In testimony whereof I affix my signature.

PETRUS van SANTEN KOLFF.

Copies of this patent may be obtained for five cents each, by addressing the "Commissioner of Patents, Washington, D. C."